United States Patent
Loftis et al.

[11] Patent Number: 6,009,136
[45] Date of Patent: Dec. 28, 1999

[54] DAMPED STORAGE RACK FOR NUCLEAR FUEL ASSEMBLIES

[75] Inventors: Joseph M. Loftis, Pittsburgh; William J. Wachter, Wexford, both of Pa.

[73] Assignee: Ionics, Incorporated, Watertown, Mass.

[21] Appl. No.: 09/020,981

[22] Filed: Feb. 9, 1998

[51] Int. Cl.$^6$ .................................................. G21C 19/07
[52] U.S. Cl. ...................... 376/272; 250/506.1; 250/507.1
[58] Field of Search .................. 376/272; 250/506.1, 250/507.1; 220/23.83, 23.89

[56] References Cited

U.S. PATENT DOCUMENTS

| | | | |
|---|---|---|---|
| Re. 31,661 | 9/1984 | Mollon | 250/507.1 |
| 3,900,116 | 8/1975 | Gehri | 376/285 |
| 4,042,828 | 8/1977 | Rubenstein et al. | 250/506.1 |
| 4,177,386 | 12/1979 | Wachter et al. | 250/506.1 |
| 4,187,433 | 2/1980 | Zezza | 250/506.1 |
| 4,230,144 | 10/1980 | Chalmers | 376/285 |
| 4,342,620 | 8/1982 | Vickrey | 250/507.1 |
| 4,366,115 | 12/1982 | Schlumpf | 376/272 |
| 4,695,424 | 9/1987 | Flynn | 376/272 |
| 4,800,283 | 1/1989 | Efferding | 250/506.1 |
| 4,857,263 | 8/1989 | Machado et al. | 376/272 |
| 4,948,553 | 8/1990 | Machado et al. | 376/272 |
| 5,384,813 | 1/1995 | Loftis et al. | 376/272 |

Primary Examiner—Charles T. Jordan
Assistant Examiner—Jack Keith
Attorney, Agent, or Firm—Lappin & Kusmer LLP

[57] ABSTRACT

A storage rack for storing nuclear fuel rod assemblies is provided with an array of cell housings having support elements which are preloaded against the adjacent corner of the adjacent cell housing. The support elements are fixed to the outer corner of one cell housing and have pads which are preloaded or biased against the adjacent corner of the adjacent cell housing. The interface between the pads of the support elements and the adjacent cell housing provide a coulomb damping function which is effective in absorbing vibration from rough handling or seismic events. The cell housings can be located in alternating positions in the array and additional cell locations can be formed from the outer walls of the surrounding cell housings. The cell housings are held together in the array by support bars which are affixed to the top and bottom ends of the cell housings. The support bars may include recesses to align the cell housings.

19 Claims, 7 Drawing Sheets

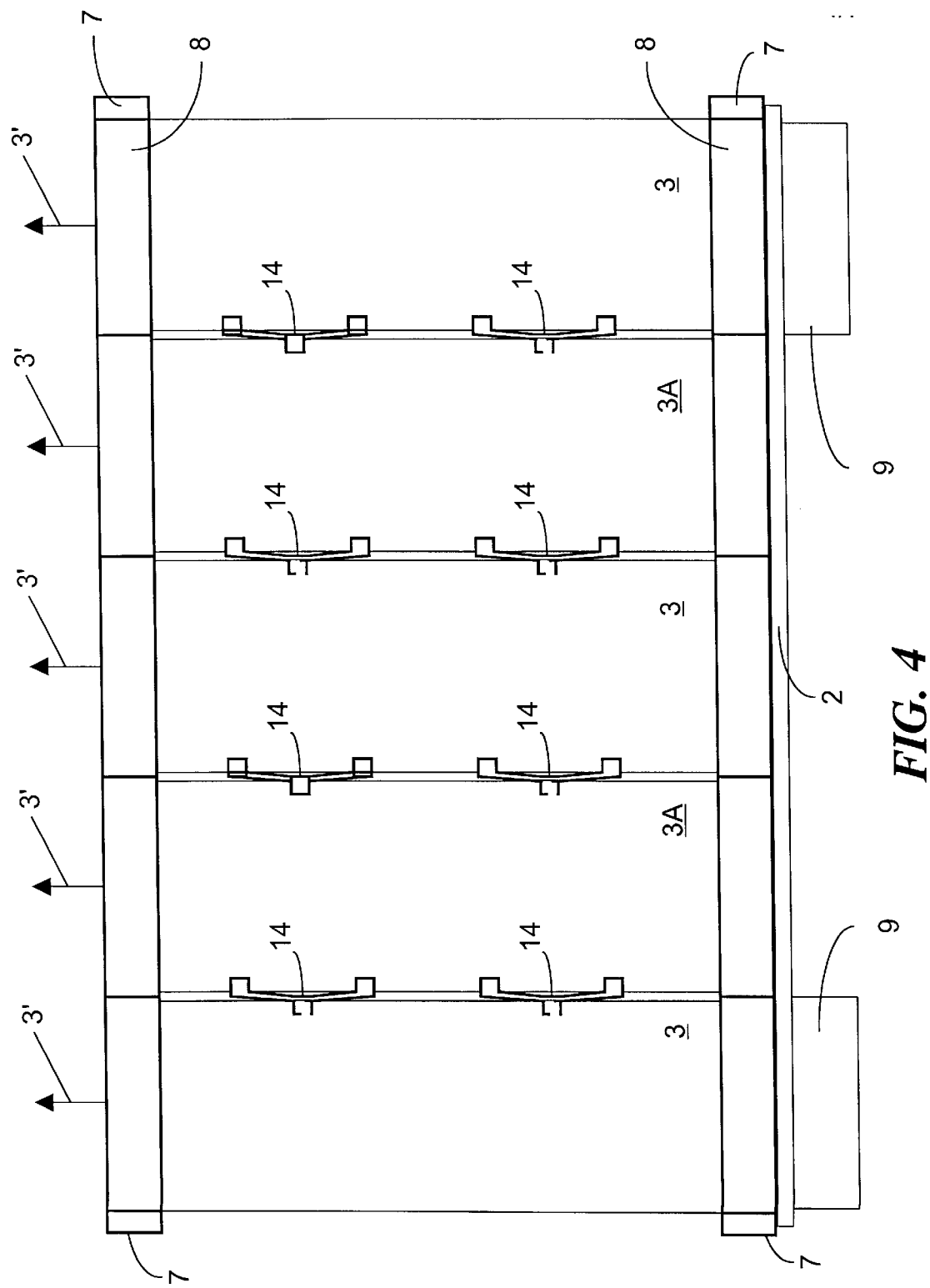

DAMPED STORAGE RACK FOR NUCLEAR FUEL ASSEMBLIES

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

The invention relates to storage racks for storing nuclear fuel assemblies both during transport and during stationary storage. Preferably, the racks are highly overdamped, enabling them to best withstand vibrations caused by seismic events or rough handling.

Fuel for nuclear reactors is typically configured in the form of elongated fuel rods, which may be separate, stand-alone elements, or may be positioned within canisters. Hereinafter, the fuel rods and rod/canister combinations are referred to as fuel assemblies. Both before and following use, the fuel assemblies must be stored and/or transported with great care. To assure that such care is achieved, storage racks are often used to support a plurality of fuel assemblies in a generally parallel, spaced-apart configuration, while maintaining the fuel assemblies in a subcritical array environment. During storage, the racks and the fuel assemblies contained therein, may be completely submerged in a pool of water. The water provides cooling and additional shielding from nuclear radiation.

The fuel storage racks of the prior art typically consist of an assembly of hollow cells, each defined by an array of elongated rectangular cross-section boxes or compartments. The boxes are typically made by forming sheets of stainless steel into elongated rectangular cross-section tubes (typically 9 inches square by 14 feet long and welding the corners of the elongated tubes together to form a matrix of elongated hollow cells, each adapted the receive a single fuel assembly. Typically, the tubes are joined at their corners to common rod segments that are located at various positions along the adjacent corners of the tubes. Exemplary storage racks are disclosed in U.S. Pat. Nos. 4,695,424, 4,857,263, 4,948,553, and 4,366,115. Alternatively, the tubes can be held in place by support bars that are welded or otherwise affixed to the top and bottom ends of each tube such as disclosed in commonly owned U.S. Pat. No. 5,384,813 entitled Highly Damped Storage Rack for Nuclear Fuel Assemblies, which is hereby incorporated by reference.

A neutron absorbing (or "poison") material, such as borated stainless steel, is typically welded or otherwise rigidly affixed to each of the walls of the boxes to absorb neutron flux from the fuel assemblies which may be positioned within the boxes, thereby avoiding an undesirable concentration of neutrons. Alternatively, the neutron absorbing material can preloaded against the walls of the tube as described in commonly owned U.S. Pat. No. 5,384,813 in order provide a coulomb damping function for improved resistance to vibration damage.

One of the problems associated with assembling prior art storage racks is that the tolerance variation of the longitudinal bow for the tubes can vary up to ±0.1875 inches. After assembling the tubes together at their ends, any bow over the fourteen foot length of the tube makes it difficult to weld rod segments at positions intermediate to the ends. In addition, if the bow were to increase over time, the adjacent corners could bear against each other, potentially causing premature failure of the storage rack.

Accordingly, it is an object of the present invention to provide an improved storage and/or transport rack for nuclear fuel assemblies.

Another object of the present invention is to provide an improved storage rack for nuclear fuel assemblies which is highly overdamped to enable the rack to withstand the vibration of seismic events or rough handling such as may be encountered during transportation of the rack.

It is another object to provide a storage rack for nuclear fuel assemblies which has improved torsional and crush strength.

A further object is to provide an improved storage rack for nuclear fuel assemblies which may be easily and inexpensively manufactured.

It is yet another object to provide a storage rack for nuclear fuel assemblies which is resistant to failure due to the bowing of the tubes of the storage rack.

It is yet a further object to provide a storage rack for nuclear fuel assemblies which is resistant to failure due to the bowing of the individual cell tubes of the storage rack by providing support elements that are positioned between adjacent cell tubes of the storage rack in order to facilitate alignment of the cell tubes and resist bowing by biasing the support elements against adjacent cell tubes to distribute the forces attributable to bowing over the adjacent cells.

Other objects of the invention will in part be obvious and will in part appear hereinafter.

SUMMARY OF THE INVENTION

According to the present invention, a rack structure is provided for long term storage and/or transport of nuclear fuel assemblies. The storage rack includes an array of individual storage cells. The cells of the array are defined by a plurality of substantially round or polygonal cross-section, elongated cell housings, each extending along an elongated central axis, wherein the central axes are substantially parallel to each other. In accord with an important aspect of the invention, a support element includes a first portion adapted to be fixed to one of the cell housings and a second portion adapted to press or be biased against an adjacent cell housing. A stiffener wall may be welded to the adjacent cell housings along the perimeter of the rack to enclose the open cells along the perimeter. The cell housings and the stiffener walls are held in parallel alignment by support bars affixed thereto, for example by welding, at both the top and bottom ends of the array of cell housings. Preferably, the support bars are positioned at the top and bottom ends between each row of cell housings and along the outer perimeter of the rack. The support bars may be recessed on one side or on alternating sides to provide positioning of the cell housings prior to affixation. A base plate is affixed to the bottom of the array to define the lower boundary of the respective cells and to support the fuel assemblies therein. To facilitate water flow for cooling of the nuclear fuel assemblies, the base plate may include holes at positions within each cell. Pedestals extending from the base plate may be used to raise the rack above a floor.

Preferably, the cell housings are substantially square in cross-section and positioned in alternate points of a rectangular grid configuration, so that each cell housing defines one cell in its interior and so that the outer walls of three or more adjacent cell housings define one cell. The first portion of the support element is adapted to be fastened to one corner of the cell housing and the second portion of the support element is adapted to engage and bear against the corner of an adjacent cell housing.

The second portion of the support element is adapted to be pressed or biased against the outer wall of the adjacent cell housing. The resulting friction between the second portion and cell wall results in a coulomb damping function that is effective in damping vibration. The support elements also serve to align the cells during assembly and help to make the overall assembly more resistant to bowing by individual cell housings. The support elements can be fastened to one of the cell housings by welding, brazing or mechanical fastening. The second portion of the support element is merely adapted to engage and bear against an adjacent object or an adjacent cell housing. The second portion may also be further adapted to enhance the friction with the adjacent cell housing in order to improve coulomb damping performance.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 4 is an elevation view of the storage rack of FIG. 2.

DESCRIPTION OF THE PREFERRED EMBODIMENTS

Figure 1:
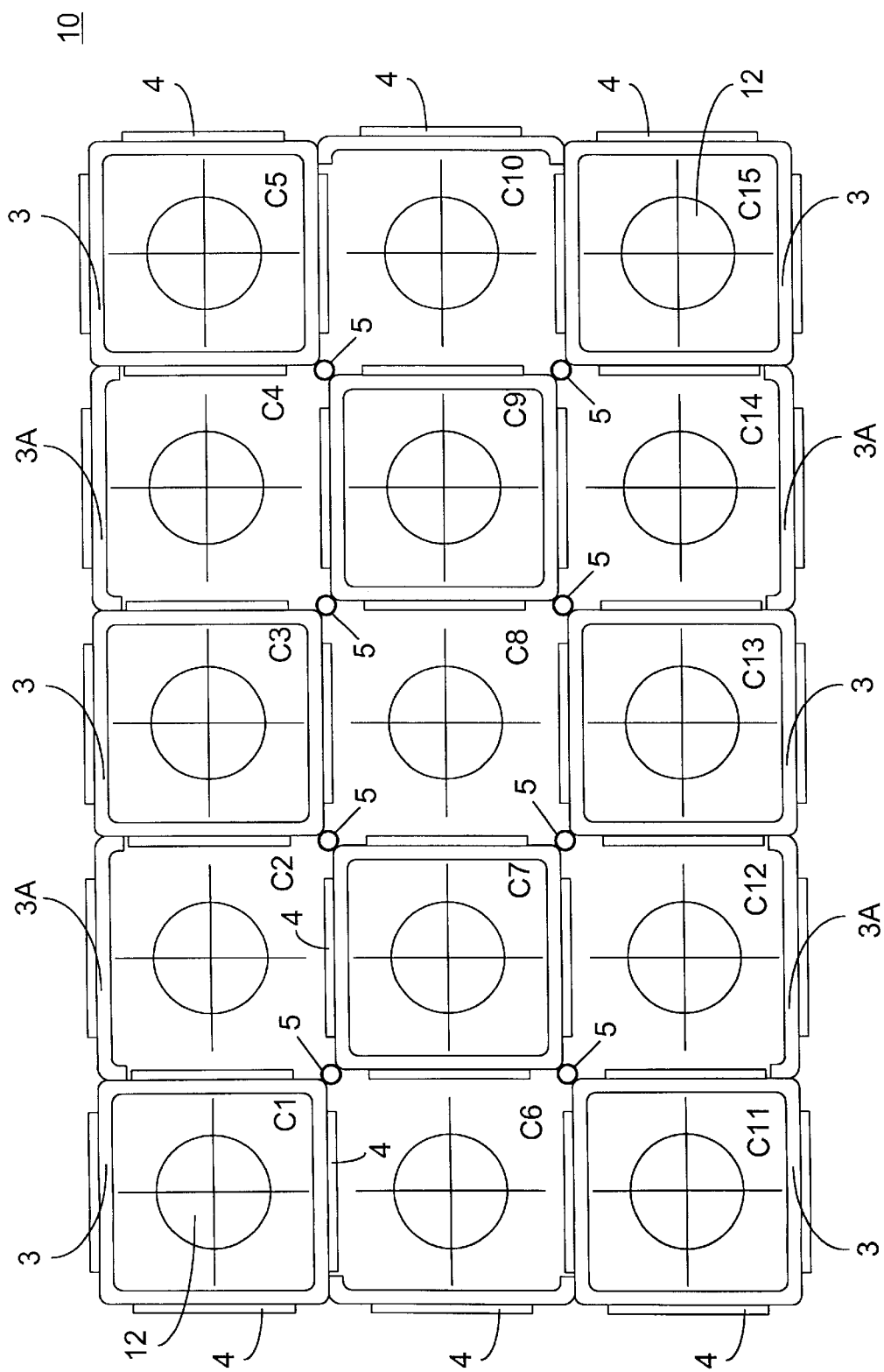
FIG. 1 is a plan view of a storage rack in accordance with one embodiment of the invention.
Figure 2:
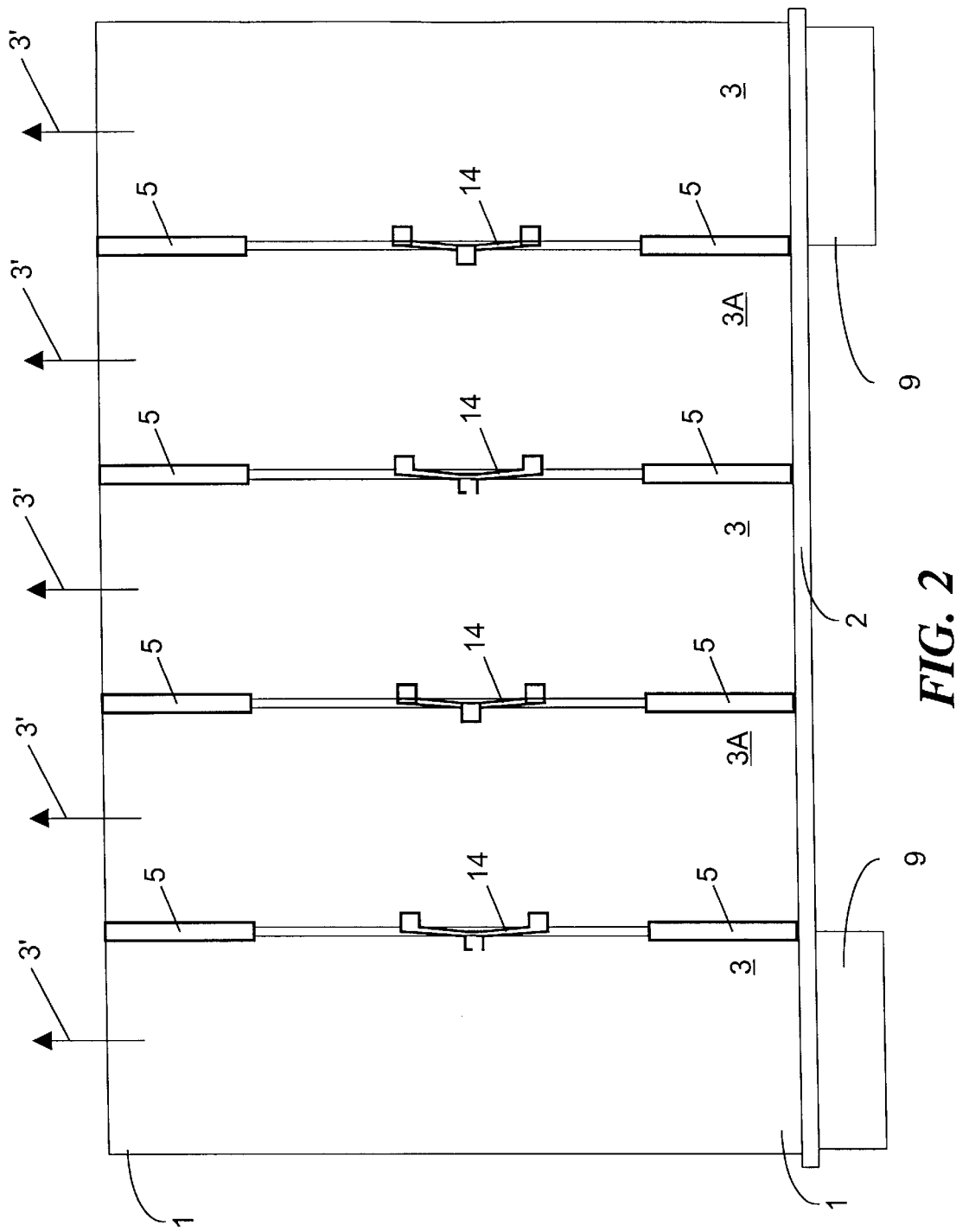
FIG. 2 is an elevation view of the storage rack of FIG. 1.
Figure 3:
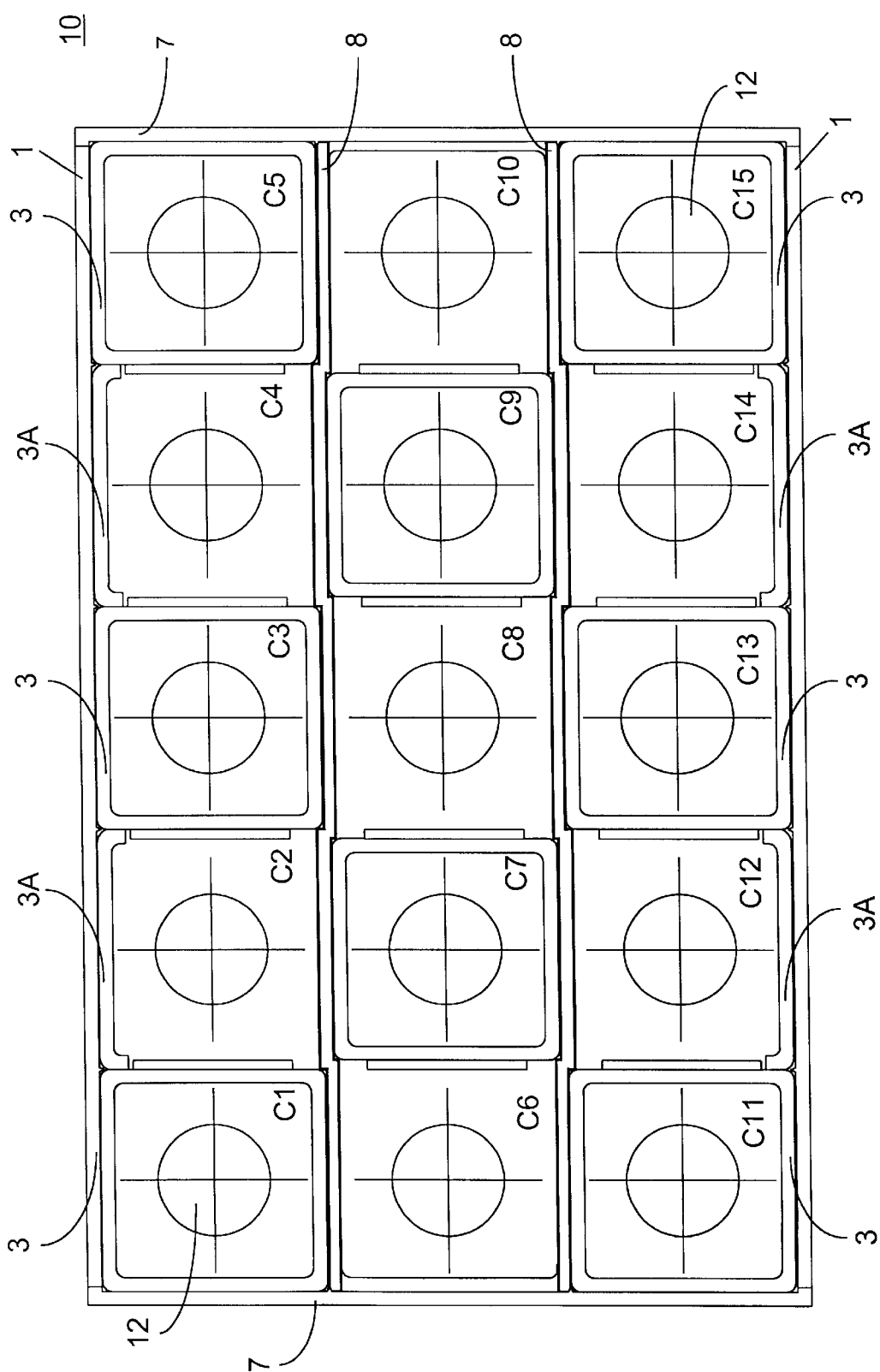
FIG. 3 is a plan view of a storage rack in accordance with an alternate embodiment of the invention.

FIGS. 1–4 show two embodiments of a storage rack 10 of the invention, which forms a close packed array, 3 rows by 5 columns of elongated cells C1–C15. In these embodiments, the odd numbered or primary cells C1, C3, C5, C7, C9, C11, C13, C15 are formed from rectangular cell housings 3 which extend along housing axes 3'. The even numbered or secondary cells C2, C4, C6, C8, C10, C12, C14 are formed by the walls of the surrounding cells. It is noted that the secondary cells along the perimeter of the array C2, C4, C6, C10, C12, C14 are not completely surrounded by primary cells. If it is necessary that one of these secondary cells is to be utilized, a stiffener wall 3A is inserted substantially flush with exterior walls of the adjacent primary cell housings to completely enclose the secondary cell as shown in FIG. 3.

In the embodiment of FIGS. 1 and 2, the individual cell housings 3 are assembled into a rack assembly by fixturing the individual cell housings 3 and welding adjacent corners of the cell housings 3 to rod segments 5. The rod segments 5 can have various shapes and sizes including round, square, triangular or wedge. The major tolerance variation in the longitudinal bow of the cell housings 3 is from approximately ±⅛ inches to ±³⁄₁₆ inches and thus the rod segments 5 can vary in diameter from zero to ⁵⁄₁₆ inches in diameter. The stiffener wall 3A, if required, can be welded to the adjacent cell housings 3.

In the embodiment of FIGS. 3 and 4, the individual cell housings 3 and the stiffener walls 3A are held in parallel alignment by upper and lower support bars 1, 7, and 8 which extend transverse to the longitudinal axis of the cell housings 3. The support bars 1, 7 and 8 are located between each of the rows of cells and along the perimeter of the array as shown in FIG. 3. Support bars 1, 7 and 8 are provided at both the top and bottom end portions of the rack. The cell housings are held in parallel alignment by welding the individual cell housings 3 to the upper and lower support bars 1, 7 and 8. The support bars also add strength to the upper and lower ends of the cell housings to resist damage during inserting and removal of the nuclear fuel rod assemblies.

As shown in FIGS. 2 and 4, a base plate 2 is welded to the bottom of the rack to close the bottom of the cells and support the nuclear fuel assemblies. The base plate 2 may also be provided with holes 12 (shown in FIGS. 1 and 3) at locations within each cell and pedestal feet 9 to facilitate the flow of water for enhanced cooling.

Each cell housing 3 is an elongated tube, typically having a square or rectangular cross-section. The housing is constructed from suitable material, for example, 0.090 inch thick stainless steel tubing. Preferably, the tubes are square in cross-section, approximately nine inches along each side and 14 feet long. Each outer surface of the housing is planar, to which is applied, with or without a preload force, an elongated slab 4 constructed of a damping material. This damping material can also be a neutron absorbing material, such as borated stainless steel, borated aluminum, boral (such as manufactured by Brooks & Perkins, Minneapolis, Minn.), or other neutron absorbing materials may be used. The damping material can be fixed to outside of the cell housings (such as by welding or brazing) or the damping material can be preloaded against the outer surface by retainer clips (not shown) which are welded to the outside of the housings along the perimeter of each surface as disclosed in commonly owned U.S. Pat. No. 5,384,813.

As shown in FIGS. 2 and 4, each of the cell housings 3 can include one or more support elements 14 fixed at one corner on the outside of the cell housing 3 which are adapted to bear against the adjacent corner of an adjacent cell housing 3. The support element 14 serves to align the cell housings 3 during assembly and further functions to help the cell housing resist bowing after assembly. In addition, the portion of the support element that bears against the adjacent corner of the adjacent cell housing 3 can provide coulomb damping of vibration in the individual cell housings 3.

Figure 5B:
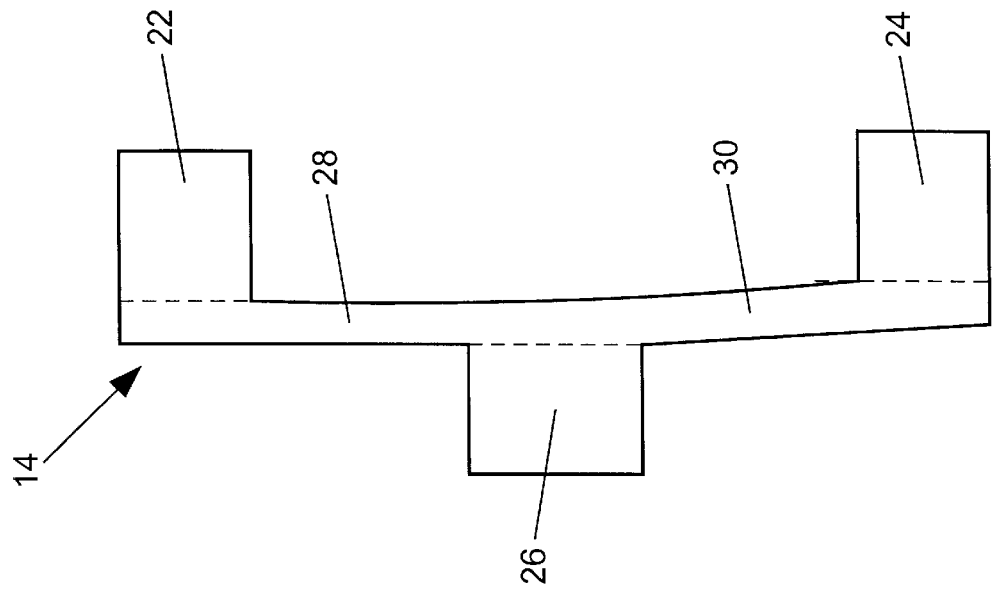
FIG. 5B is a formal view of the support element in accordance with the present invention.
Figure 5A:
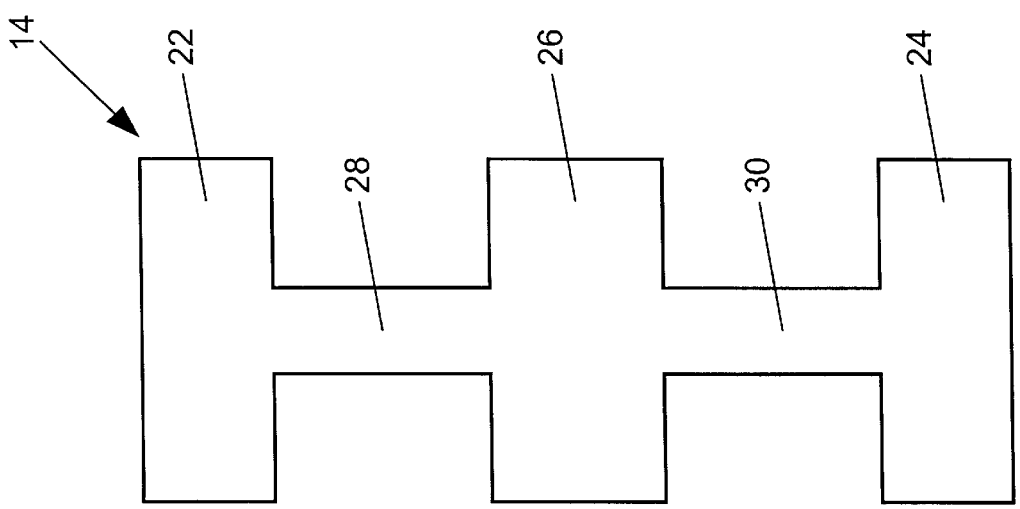
FIG. 5A is a layout view.

FIG. 5A shows a diagrammatic layout view of a support element 14 (prior to forming) in accordance with one embodiment of the present invention. Support element 14 includes a first portion adapted to engage a first cell housing and at least one second portion adapted to bear against an adjacent cell housing. Preferably, the support element 14 has a second portion which includes upper tabs 22 and a third portion which includes lower tabs 24. The upper tabs 22 and the lower tabs 24 are connected by upper arm 28 and lower arm 30, respectively, to the first portion which includes central tabs 26. In the preferred embodiment, the support element 14 is formed from 0.060 inch thick stainless steel that is approximately 3 inches long. The upper and lower tabs 22 and 24 are approximately 0.25 inches wide and extend from approximately 0.22 inches from the upper and lower arms 28, 30. The central tabs 26 are approximately 0.50 inches wide and extend from approximately 0.22 inches from the upper and lower arms 28, 30. The width of each of the upper and lower arms 28, 30 is approximately 0.180 inches.

Figure 5C:
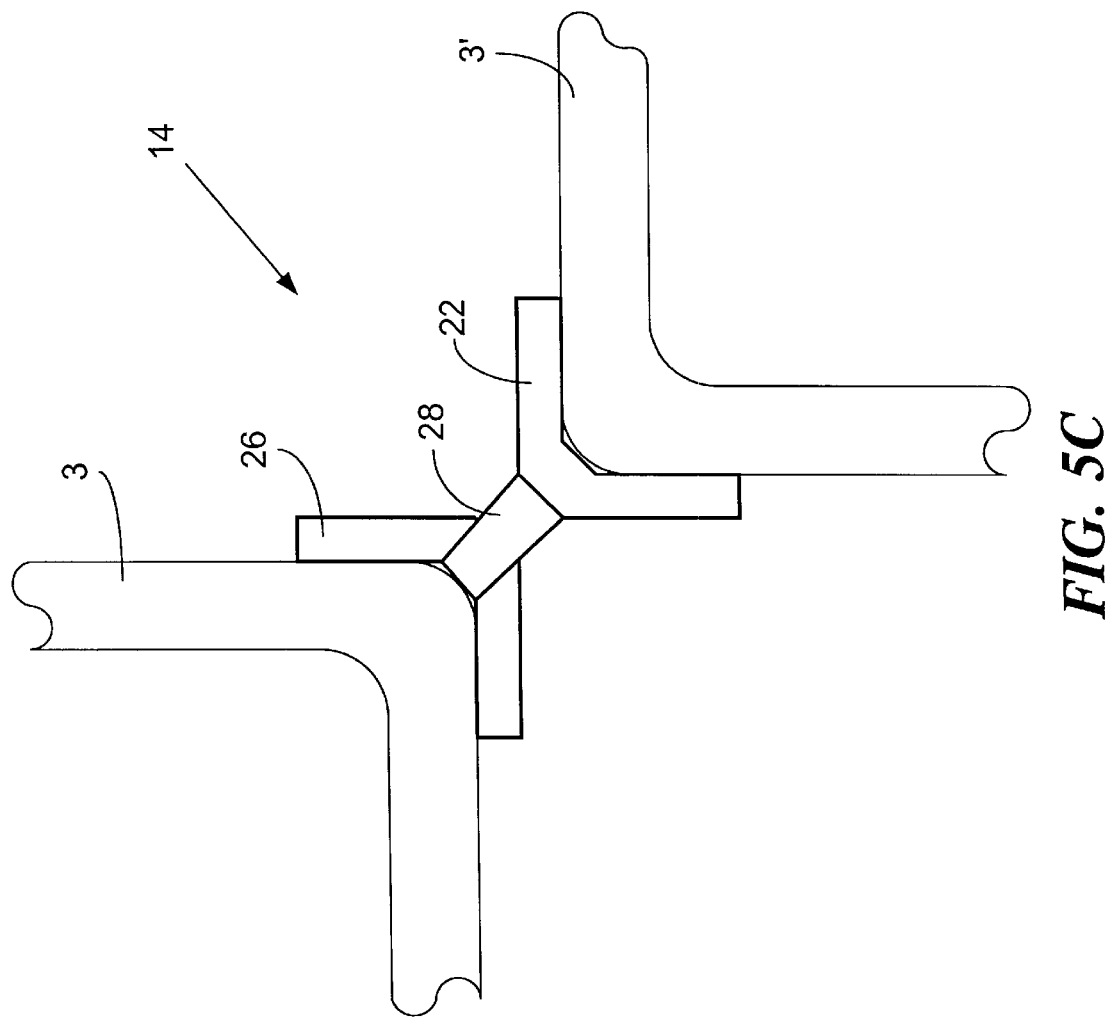
Figure 5C is a top view of a support element installed between two cell housings in accordance with the present invention.

FIGS. 5B and 5C shows diagrammatic views of a formed support element 14 in accordance with one embodiment of the present invention. Upper and lower tabs 22 and 24 are bent, toward the same side of the upper and lower arms 28, 30, to a 90 degree angle to form an inside corner that is adapted to engage the outside corner of an adjacent cell housing 3. The central tabs 26 are bent, toward the opposite side from the upper and lower tabs 22, 24, to a 90 degree angle to form an inside corner that is adapted to engage and be fastened the outside corner of a cell housing 3. The central tabs 26 can be fastened to the cell housing 3 by any fastening method including welding, brazing or the use of mechanical fasteners or adhesives.

Upper and lower tabs 22, 24 form pads that bear against the adjacent corner of an adjacent cell housing. The interface between the upper and lower tabs 22, 24 and the outer surfaces that form the adjacent corner of the adjacent cell housing is such that they establish a coulomb damping function that damps vibration in the storage rack. The upper and lower arms 28, 30 preferably act as leaf springs to press or bias the upper and lower tabs 22, 24 respectively against the adjacent corner of the adjacent cell housing 3. In addition, the support elements 14 facilitated alignment of the cell housings 3 in the array during assembly and serve to maintain the array integrity by opposing bowing of individual cell housings. Thus, when all the cell housings are aligned via support elements 14, any tendency of an individual cell housing to bow is opposed by the support elements in contact therewith and the adjacent cell housings which distribute the load due to bowing over the adjacent cell housings. As shown in FIG. 5B, One or both of the upper and lower arms 28, 30 can be curved or formed prior to installation to enhance the bias force of the pads of upper and lower tabs 22, 24 against the adjacent cell housing. For example, in FIG. 5B, lower arm 30 is curved or bent away from central tab 26 in order to increase the pressure that lower tab 24 applies on the adjacent cell housing after it is installed.

FIG. 5C shows a top view of a support element 14 installed between adjacent corners of two cell housings 3 and 3'. Tabs 26 of support element 14 are fastened the adjacent sides that form the corner of cell housing 3 and tabs 22 bear against the adjacent sides that form the corner of cell housing 3'. In the preferred embodiment, two support elements are installed between adjacent cell housings. Preferably, the two support elements are fastened at positions that are equally spaced from the ends of the cell housings and from each other. In one preferred embodiment, each cell housing is fabricated with two support elements on each of two adjacent corners and each of the cell housings is positioned in the array that forms the storage rack wherein the two corners that carry the support elements are oriented in the same direction.

Figure 6:
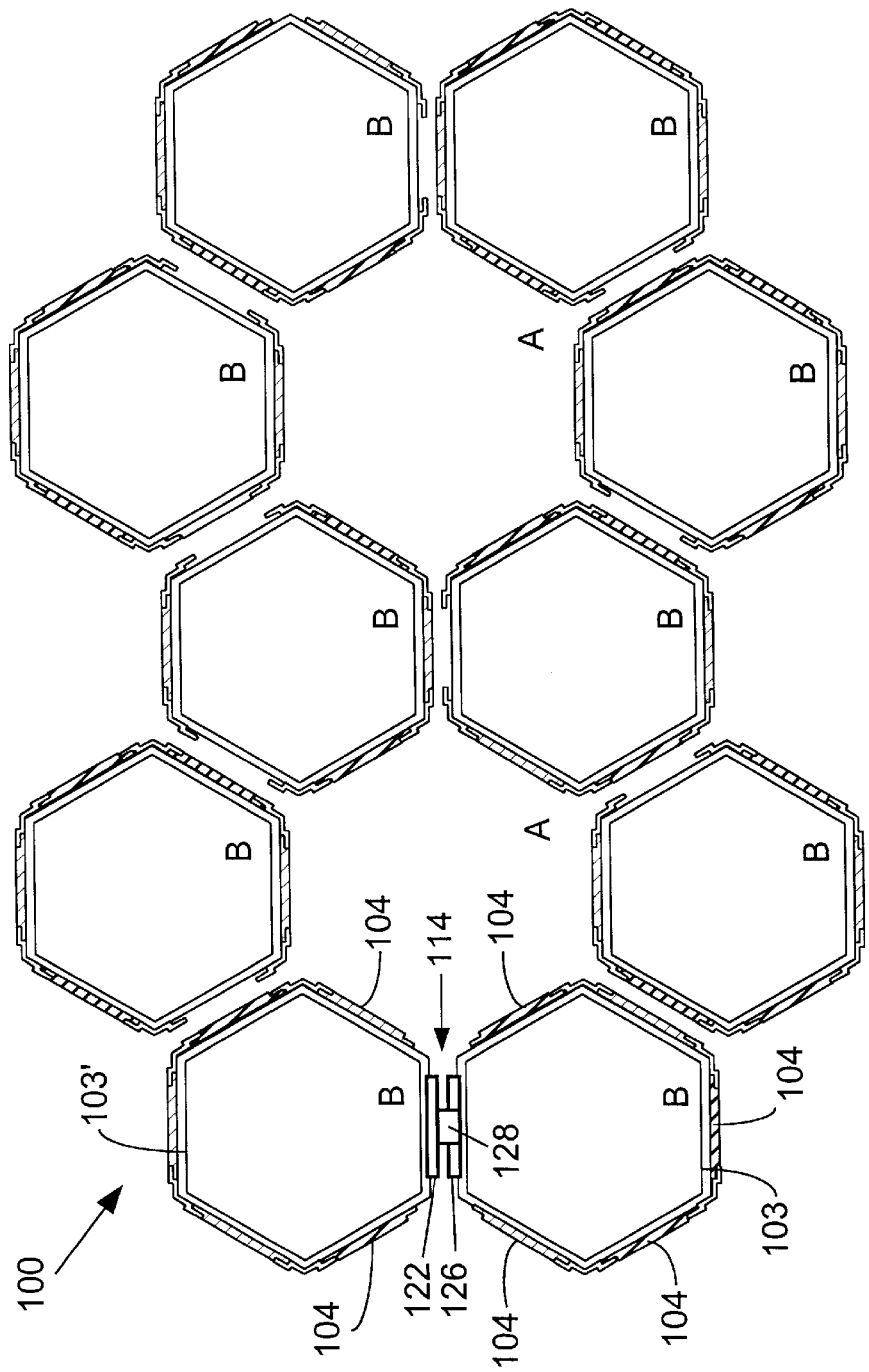
FIG. 6 is a plan view of an alternative embodiment of the invention.

FIG. 6 shows a top view of storage rack 100 in accordance with an alternative embodiment of the invention. In this embodiment, the cell housings 103 are hexagonal in cross-section as opposed rectangular or square and the sides of the cell housings, as opposed to the corners of the cell housings are adjacent to one another. As one having ordinary skill in the art will appreciate, the cell housings 3, 103 can have any cross-sectional shape including round or circular cross-sections and polygonal cross-sections. In accordance with the invention, one or more support elements 114 are disposed between two adjacent cell housings. In this embodiment, the support element 114 is formed substantially as shown in FIG. 5A and the tabs are not bent or formed. The central tabs 126 are fastened to one side of cell housing 103 and the upper tab 122 and the lower tab (not shown) are pressed or biased against an adjacent side of cell housing 103'. In this configuration, the support elements 114 provide a coulomb damping function to reduce vibration and help align the cell housings in the matrix as described above.

Depending upon the cross-sectional shape of the cell housings and geometry of the array, the features (e.g. a side or corner) of one cell may be adjacent to a different feature of an adjacent cell. Preferably, the first portion of the support element is adapted to conform to the surface contour and engage the feature or portion of the cell housing that it is to be fixed to. Thus, for example if the first portion is adapted to be fixed to an outside corner, the first portion is conformed with a complementary inside corner shape. Alternatively, if the first portion is adapted to be fixed to a flat surface or a curved surface, the first portion is substantially flat or curved, respectively to facilitate engagement. Similarly, the second portion is adapted to conform to the surface contour of the feature to which it is to engage. In addition, either the second portion or the feature (or both) may be further adapted to change the friction between them in order to change the coulomb damping performance. For example the surface of the second portion or the feature may be textured and/or coated and/or plated with a material to change the frictional characteristics and the coulomb damping performance. Alternatively, a friction enhancing pad may be fixed to either the second portion or the feature (or both).

One of ordinary skill will appreciate that in all embodiments of the invention including those shown in FIGS. 1–6, that the cell housings 3, 103 can be provided with neutron absorbing or "poison" material 4, 104. The poison material 4, 104 can be either fixed to the cell housing or the poison material 4, 104 can be held in place by clips or a cover plate as disclosed in commonly owned U.S. Pat. No. 5,348,813. In addition, as one of ordinary skill will appreciate, the number, size and configuration of support elements 14, 114 can be readily determined as a function of the desired level of vibration damping. Furthermore, while specific embodiments have disclosed having either corner bearing or side bearing support elements, one of ordinary skill in the art will appreciate that both corner bearing and side bearing support elements can be used in the same rack assembly, depending upon the level of vibration damping required.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A storage container for storing nuclear fuel assemblies comprising:
   a tubular housing;
   a support element having a first portion fixedly coupled to said tubular housing and having at least a second portion adapted to bear against an adjacent object;

said support element having a means for biasing said second portion against said adjacent object.

2. A storage container according to claim 1, wherein the tubular housing has at least one substantially planar surface and said support element is fixedly coupled to said planar surface.

3. A storage container according to claim 2, wherein said adjacent object is a tubular housing having a substantially planar surface and said second portion of said support element is adapted to engage said substantially planar surface.

4. A storage container according to claim 3, wherein said second portion of said support element and said substantially planar surface form an interface that provides coulomb damping of vibration.

5. A storage container according to claim 1, wherein said adjacent object is a tubular housing having two substantially planar surfaces that form a corner and said second portion of said support element is adapted to engage said corner.

6. A storage container according to claim 5, wherein said second portion of said support element and said corner form an interface that provides coulomb damping of vibration.

7. A storage container according to claim 1, wherein the tubular housing has at least two substantially planar sides, which form a corner and said support element is fixedly coupled to said corner.

8. The storage container according to claim 7, where in the second portion of said support element is adapted for engaging a corner of an adjacent tubular housing.

9. The storage container according to claim 1, wherein the second portion of said support element is adapted to provide coulomb damping of vibration in said storage container and said object.

10. A storage rack for storing nuclear fuel assemblies comprising:
a plurality of storage containers according to claim 1 and associated means for supporting said storage containers in a fixed array.

11. A storage rack for storing nuclear fuel assemblies comprising:
a plurality of storage containers, each of said storage containers including a tubular housing;
associated means for supporting said plurality of storage containers in a fixed array; and
at least one of said storage containers further including at least one support element having a first portion fixedly coupled to said tubular housing and having a second portion adapted to bear against an adjacent storage container, whereby said second portion is biased against said adjacent storage container.

12. A storage rack according to claim 11, wherein the tubular housing has at least one substantially planar surface and said support element is fixedly coupled to said planar surface.

13. A storage rack according to claim 12, wherein said adjacent object is a tubular housing having a substantially planar surface and said second portion of said support element is adapted to engage said substantially planar surface.

14. A storage rack according to claim 13, wherein said second portion of said support element and said substantially planar surface form an interface that provides coulomb damping of vibration.

15. A storage rack according to claim 11, wherein said adjacent object is a tubular housing having two substantially planar surfaces that form a corner and said second portion of said support element is adapted to engage said corner.

16. A storage rack according to claim 15, wherein said second portion of said support element and said corner form an interface that provides coulomb damping of vibration.

17. A storage rack according to claim 11, wherein the tubular housing has at least two substantially planar sides, which form a corner and said support element is fixedly coupled to said corner.

18. The storage rack according to claim 17, where in the second portion of said support element is adapted for engaging a corner of an adjacent tubular housing.

19. The storage rack according to claim 11, wherein the second portion of said support element is adapted to provide coulomb damping of vibration in said storage container and said object.

* * * * *